(12) United States Patent
Bodum

(10) Patent No.: US 6,968,774 B1
(45) Date of Patent: Nov. 29, 2005

(54) COFFEE-MAKER

(75) Inventor: Jørgen Bodum, St. Niklausen (CH)

(73) Assignee: PI-Design AG, Triengen (CH)

( * ) Notice: Subject to any disclaimer, the term of this patent is extended or adjusted under 35 U.S.C. 154(b) by 0 days.

(21) Appl. No.: 10/878,368

(22) Filed: Jun. 29, 2004

(30) Foreign Application Priority Data

Jun. 21, 2004 (DE) .................. 20 2004 009 759 U

(51) Int. Cl.[7] .......................... A47J 31/00; A47J 31/04
(52) U.S. Cl. .......................... 99/285; 99/292; 99/295; 99/299; 99/303; 99/305; 99/309
(58) Field of Search .................. 99/495, 292, 293, 99/299, 295, 300–310, 285; 426/433

(56) References Cited

U.S. PATENT DOCUMENTS

| | | | |
|---|---|---|---|
| 1,188,249 A | | 6/1916 | Cook |
| 1,624,606 A | * | 4/1927 | Lane .......................... 99/495 |
| 1,917,071 A | * | 7/1933 | Smith ......................... 99/495 |
| 1,947,426 A | * | 2/1934 | Smith ......................... 99/495 |
| 2,346,924 A | * | 4/1944 | Lehmann ..................... 99/495 |
| 3,077,156 A | * | 2/1963 | Egi et al. ..................... 99/495 |
| 3,334,573 A | * | 8/1967 | Kanemaru et al. ............ 99/495 |
| 3,368,476 A | * | 2/1968 | Mancioli ...................... 99/495 |
| 3,429,255 A | | 2/1969 | Pedalino |
| 3,580,163 A | | 5/1971 | Farrell |
| 3,638,555 A | * | 2/1972 | Mancioli ...................... 99/303 |
| 3,667,645 A | | 6/1972 | Emmer |
| 4,642,443 A | | 2/1987 | Jorgensen et al. |
| 4,843,954 A | * | 7/1989 | Henn .......................... 99/292 |
| 5,463,935 A | * | 11/1995 | Zanarini ...................... 99/292 |
| 5,894,785 A | | 4/1999 | Molinari |

FOREIGN PATENT DOCUMENTS

WO    WO 98/17160 A1    4/1998

* cited by examiner

Primary Examiner—Timothy F. Simone
(74) Attorney, Agent, or Firm—Sughrue Mion, PLLC

(57) ABSTRACT

A coffee-maker is disclosed. It comprises a lid (30) which closes an upper part (10) with an upper chamber. A rising pipe (14) extends into the upper chamber. This pipe has at least one lateral opening (15) in an upper end region. In order to avoid splashing of liquid coming out of the rising pipe (14), a downwardly extending splash guard (34) is present on the lid (30), which guard covers the at least one opening (15) of the rising pipe (14) laterally when the lid (30) is closed.

11 Claims, 3 Drawing Sheets

COFFEE-MAKER

BACKGROUND OF THE INVENTION (1) Field of the Invention

The present invention relates to a coffee-maker.

(2) Description of Related Art

Coffee-makers of the kind referred to in the introduction are common. From U.S. Pat. No. 5,894,785, for example, an espresso-maker such as in its basic construction has been used in households for many years is known. Water is made to boil in a lower chamber and is then, owing to the pressure which is developed, conducted through a brewing insert containing coffee powder. The coffee produced is conducted through a rising pipe, which has lateral openings at its upper end, into an upper chamber and accumulates there.

In coffee-makers of this kind, the problem arises that the coffee coming out of the rising pipe comes out of the openings uncontrolledly and in doing so dirties in particular the lid of the coffee-maker and may even force its way out.

BRIEF SUMMARY OF THE INVENTION

It is an object of the present invention to provide a coffee-maker which reduces the splashing of the lid.

This object is achieved by a coffee-maker that comprises an upper part with an upper chamber, a rising pipe extending into the upper chamber, the rising pipe having at least one laterally arranged opening provided in an upper end region, and a lid adapted for closing the upper chamber. The lid comprises a splash guard which, when the lid closes the upper chamber, extends at least to the lower edge of the at least one opening of the rising pipe and has a lateral distance from the rising pipe.

Accordingly, a splash guard, which covers the at least one opening of the rising pipe laterally when the lid is closed, is present on the lid. Lateral splashing of the coffee is thus avoided. This reduces the dirtying of the lid and moreover increases safety, as no splashes, which can lead to dangerous scalds, can come out between the lid and the upper part of the coffee-maker. As the splash guard is provided on the lid, the openings of the rising pipe remain easily accessible for cleaning purposes when the lid is open, and the splash guard itself can also be cleaned easily. This is important in particular also because unremoved coffee residues impair the flavour of subsequent preparations.

A number of radial openings, in particular two openings lying radially opposite one another, are preferably present in the upper end region of the rising pipe. Optimum flow of the coffee is thus ensured.

In an advantageous embodiment, the splash guard is designed as a ring. The height of the ring is then selected in such a way that it extends at least to the lower edge of the openings when the lid is closed.

Manufacturing is simple if the splash guard is designed in one piece with the lid.

In order to simplify operation, the lid is preferably articulated pivotably on the upper part. Moreover, the lid is preferably designed so as to be removable from the upper part, in order to simplify cleaning.

Observation of the brewing process is made possible if the lid and/or the upper part are/is at least partly transparent. Moreover, transparent parts make easy checking of cleaning possible. The provision of a splash guard on the lid is especially advantageous then as in this case splashes are especially inconvenient and obstruct observation of the brewing process.

In an advantageous embodiment, the lid and/or the upper part are/is made at least partly of polycarbonate. This plastic is not only transparent but also especially resistant to heat and ageing, breakproof and impact-resistant.

The coffee-maker can furthermore have a lower part with a lower chamber for receiving water and also a brewing insert for receiving ground coffee. In this connection, the lower part, the brewing insert and the upper part are arranged in such a way that water can pass from the lower chamber through the brewing insert into the upper chamber.

In an advantageous embodiment, the lower part comprises a safety valve which is arranged close to the upper end of the lower part. The upper part then preferably has an apron which is suitable for covering the safety valve. In this way, scalds caused by steam or hot water coming out laterally are avoided.

Autonomous operation of the coffee-maker without external heat sources is advantageously made possible by electrically operated means for heating water being present.

BRIEF DESCRIPTION OF THE DRAWINGS

The invention is described in greater detail below with reference to the drawings, in which.

DETAILED DESCRIPTION OF THE INVNETION

Figure 1:
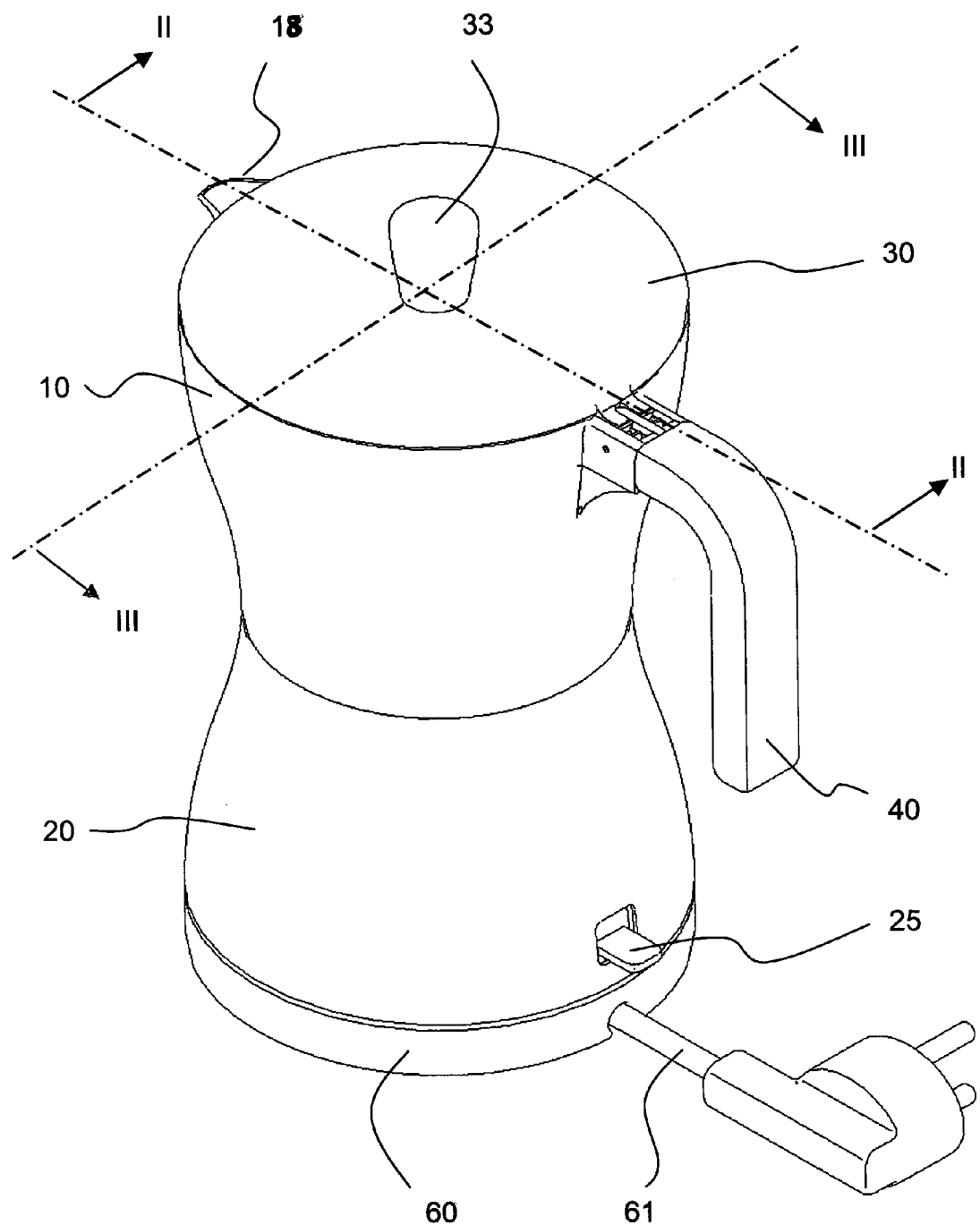
FIG. 1 shows a perspective view of an espresso-maker.
Figure 2:
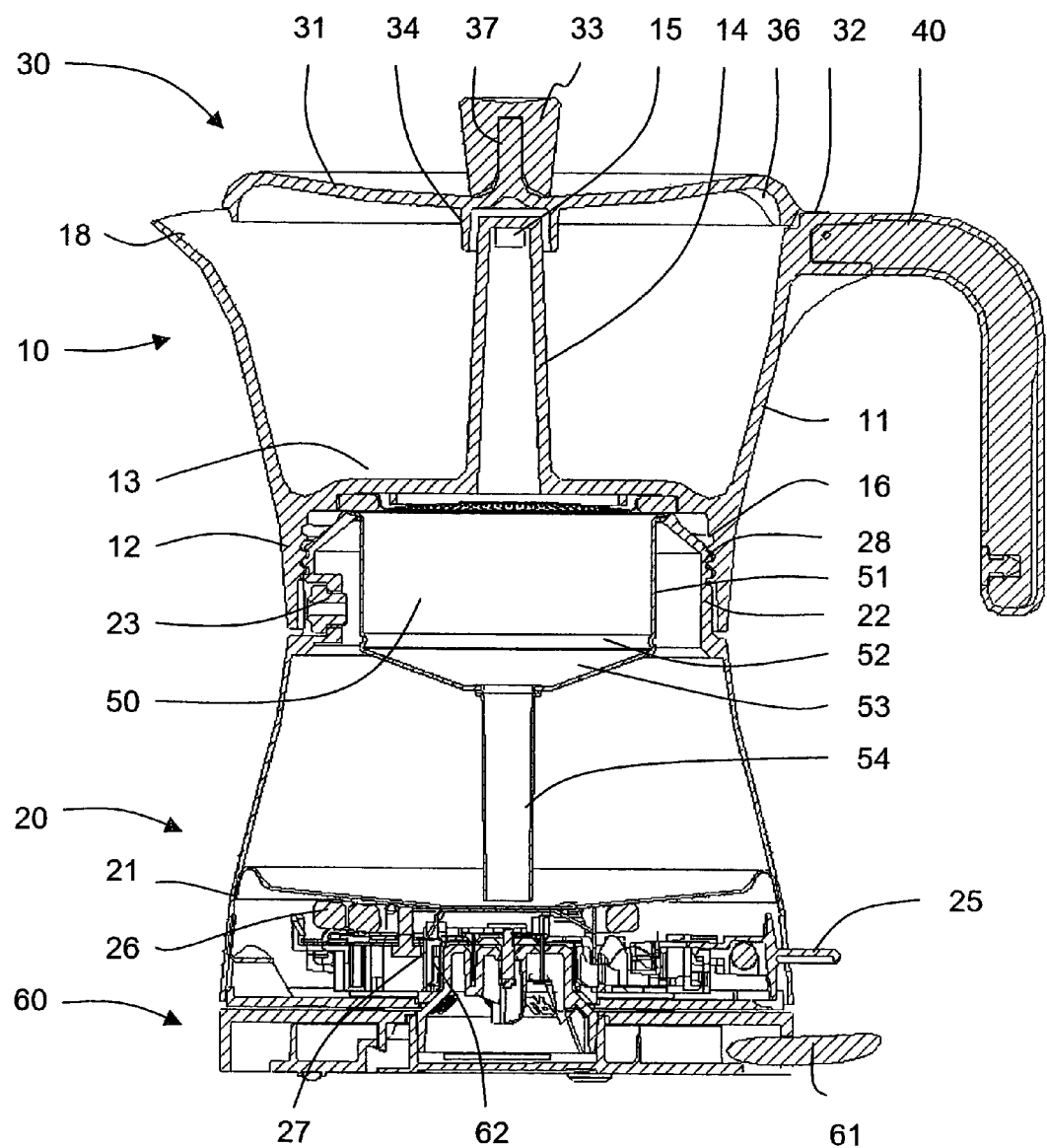
FIG. 2 shows an espresso-maker in cross section along the line II—II.

FIGS. 1 and 2 show an electrically operated espresso-maker in a perspective view and in cross section respectively as an example of a coffee-maker according to the invention. An upper part 10 with an upper chamber is screwed onto a lower part 20 with a lower chamber for receiving water. Inserted into the lower part 20 is a brewing insert 50 which extends into the lower chamber. The upper chamber is closed by a lid 30. A handle 40 is also provided on the upper part 10. The lower part 20 stands on a base plate 60.

The essentially round base plate 60 has a connection cable 61 in order to supply electric power. The cable 61 is connected electrically to a central, upwardly extending connection element 62. Provided on the lower part 20 are contact elements 27 which interact with the connection element 62 in order to supply power to a heating element 26 in the form of a heating coil. In this regard, the contacts are arranged in such a way that the lower part 20 can easily be removed from the base plate 60, the contacts being separated. The heating element 26 serves for heating water located in the lower chamber. The power supply is switched on and off by means of a switch 25. Additionally provided is an overheating protection means, which interrupts the power supply if necessary.

The lower part 20 is delimited laterally by a side wall 21 which is adjoined by an essentially cylindrical connection piece 22 with an external thread 28. Let into the connection piece 22 just below the external thread 28 is a safety valve (pressure relief valve) 23. At the upper edge of the connection piece 22, the lower part 20 has a circular opening for receiving the brewing insert 50. The lower part 20 is preferably made from stainless steel. However, other materials which are sufficiently breakproof, impact-resistant and heat-resistant are also suitable, for example aluminium or heatproof plastics.

The brewing insert 50 is constructed according to known principles. It comprises an upper region 51 for receiving ground coffee. This region is closed towards the bottom by a strainer 52. A funnel-shaped transition region 53 is adjoined towards the bottom by a pipe 54 which extends vertically into the lower chamber in the lower part 20. The brewing insert 50 also is preferably made from stainless steel or another metal.

The upper chamber in the upper part 10 is delimited by a side wall 11 and a bottom 13. From the side wall 11, an apron 12 extends downwards in a region below the bottom 13. Machined into the apron 12 is an internal thread 16 which interacts with the external thread 28 of the connection piece 22. A handle 40 is fastened to the upper part. A pourer 18 is formed at the upper edge of the upper part 10.

The apron 12 extends so far downwards that it covers the pressure relief valve 23 when the upper part 10 is screwed onto the lower part 20. To this end, the apron 12 is widened slightly in the lower region in relation to the internal thread 16 so that this region can without difficulty be pushed over the external thread 28 of the connection piece 22 and has a certain spacing radially from the safety valve 23 after the upper part 10 has been screwed onto the lower part 20. Steam which, if necessary, escapes through the safety valve 23 is thus diverted downwards between the valve 23 and the apron 12 and can come out downwardly (essentially vertically). This prevents a steam jet under high pressure escaping radially (horizontally) and scalding a user of the espresso-maker. Another advantage derives from the safety valve 23 being arranged very high up, in an upper edge region of the lower chamber 20. In known espresso-makers, a safety valve is as a rule arranged further down, in the actual side wall of the lower part. It is possible then inadvertently to fill the lower chamber so full of water that the inner side of the safety valve is covered by water. In the event of overpressure arising, hot water under pressure can escape in such a case, which can lead to dangerous scalds. With the valve 23 being arranged directly below the thread 28 in the connection piece 22, this danger is largely avoided. Furthermore, a harmonious appearance is achieved by virtue of the safety valve 23 being covered by the apron 12 and not being located visually disturbingly in the side wall 21.

Located below the bottom 13 of the upper part 10 is a strainer insert which is held in position by a flat rubber ring. Such a strainer insert with rubber ring is known in principle from commercially available espresso-makers. It serves to close the brewing insert 50 towards the top and to retain the coffee powder in the brewing insert 50 during brewing.

Figure 3:
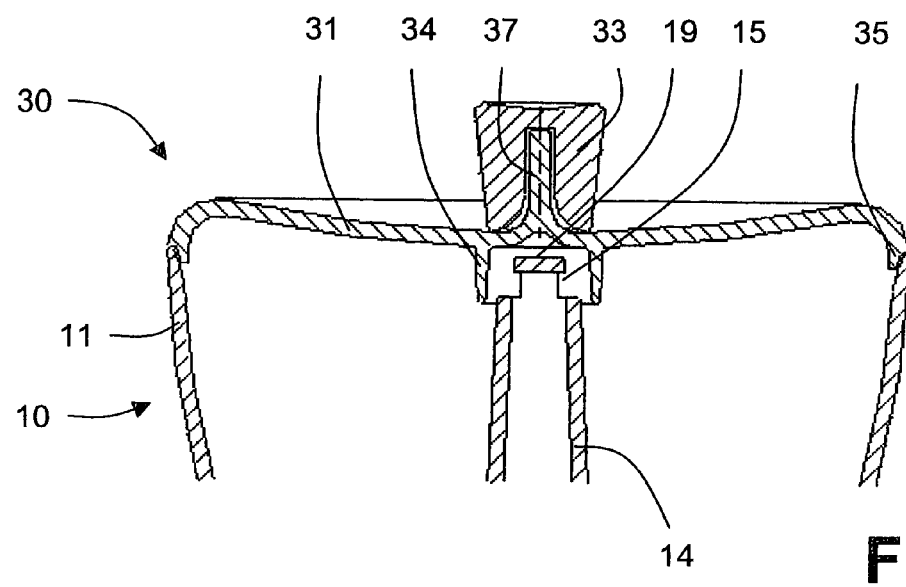
FIG. 3 shows a detailed view of the upper region of an espresso-maker in cross section along the line III—III.

The bottom 13 of the upper part 10 has a central opening, from which a rising pipe 14 extends vertically upwards. The rising pipe 14 is connected to the upper part 10 and preferably formed in one piece with it. It has an upwardly slightly tapering design and thus has essentially the shape of a truncated cone. At its upper end, the rising pipe 14 is closed in the axial direction, that is towards the top, while it has two opposite openings 15 in the radial direction, that is laterally, at its upper end. FIG. 3 clarifies the arrangement and shape of the openings 15 further, illustrating them from a different viewing direction to that in FIG. 2.

Figure 4:
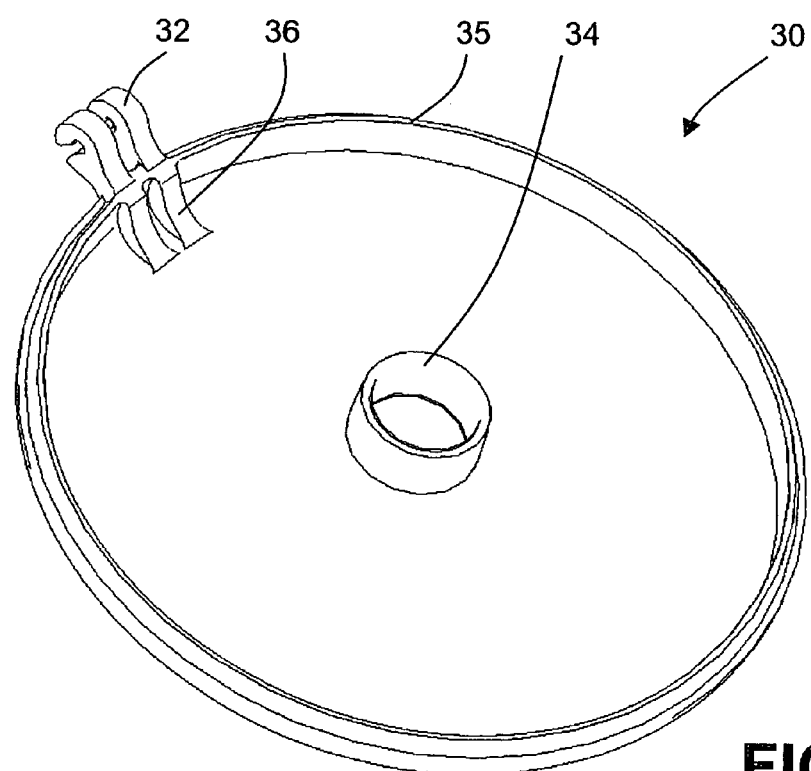
FIG. 4 shows a perspective view of a lid for an espresso-maker.

Articulated on the upper part 10 is a lid 30, which is additionally illustrated in a perspective view in FIG. 4. The lid 30 can be pivoted about a horizontal axis between an open and a closed position. The lid 30 serves to close the upper chamber 10 towards the top. A splash guard 34 in the form of a ring is formed centrally on the inner side of the lid 30. This guard is dimensioned in such a way that it covers the openings 15 of the rising pipe 14 in the closed position of the lid 30. In other words, the splash guard 34 extends at least to the lower edge of the openings 15 of the rising pipe 14 in the closed position of the lid 30.

The lid 30 has a region 31 which is curved inwardly, that is in the direction of the rising pipe 14. This curvature of the lid 30 leads to the inner lid region, which is located inside the splash guard 34, coming to lie directly above the upper end of the rising pipe 14 when the lid is closed. The curvature of the lid 30 thus makes it possible to keep the splash guard 34 short. This is desirable for aesthetic reasons but also for reasons of simple cleaning.

The outer edge 35 of the lid 30 is towards the bottom designed in such a way that it comes to lie partly inside the side wall 11 of the upper part 10 in the closed state. Formed on the outer edge 35 of the lid 30 is an extension 32 in the form of two parallel hooks with reinforcements 36 extending inwards from the outer edge 35, which extension, together with a corresponding counterpart in the upper part 10 and a pin fastened therein, serves as a hinge. As the hooks are open at an angle upwards, the lid 30 can be removed easily from the upper part 10 in the open position. A central gripping knob 33 is provided on the upper side of the lid 30. This knob is pushed onto a pin 37 formed in one piece with the lid 30 and connected to it, for example by pressing, adhesive bonding or welding.

The upper part 10 and/or the lid 30 are/is preferably made from a clear, transparent plastic. Polymethyl methacrylate in particular, which is also known by the trade name Plexiglas®, is suitable. However, manufacture from other, not necessarily transparent materials is also possible, for example from other heatproof and impact-resistant plastics or from stainless steel, aluminium or other metals. The lid 30 is preferably manufactured in an injection-moulding or die-casting process, as is the upper part 10. In this connection, the splash guard is preferably formed in one piece with the lid 30. The pin 37 too and the extension 32 as well are preferably formed in one piece with the lid 30.

In order to put the espresso-maker into operation, water is filled into the lower chamber in the lower part 20. The brewing insert 50 is then inserted and filled with ground coffee. Then the upper part 10 is screwed on. By actuating the switch 25, the heating element 26 is put into operation, which heats the water in the lower chamber. When the water comes to the boil, it is forced, owing to the pressure which is developed, through the pipe 54 into the brewing chamber where it draws the coffee powder. The ready espresso then rises through the rising pipe 14 and escapes through the openings 15 into the upper chamber in the upper part 20.

If no splash guard 34 were present on the lid, the espresso would then splash radially outwards. This would lead to dirtying of the entire lid 30. This is undesirable in particular when the lid 30 is transparent, as the espresso splashes are then unsightly. Moreover, espresso splashes could travel so far outwards that espresso finds its way out between the lid 30 and the upper edge of the upper part 10.

These disadvantages are avoided by means of the splash guard 34. As the splash guard covers the openings 15, the espresso coming out is diverted downwards and runs downwards on the exterior of the rising pipe 14, to accumulate in the upper chamber. In particular when the lid 30 is transparent, the preparation of the espresso can be observed through the lid 30 undisturbed by splashing espresso.

The openings 15 are preferably roughly 2 to 6 millimeters high and 3 to 8 millimeters wide. Correspondingly, the splash guard extends roughly 4 to 10 millimeters downwards from the inner side of the lid 30. The splash guard is preferably located at a spacing of 2 to 6 millimeters from the openings 15 in order to allow a sufficient gap. The precise dimensions depend on the overall dimensions of the espresso-maker.

Numerous variations of a coffee-maker according to the invention are possible. For example, the coffee-maker does not have to be electrically operated but can be intended for conventional heating of the water on a hot plate or on an open flame. Such a coffee-maker can also be suitable for use in a microwave oven if appropriate materials are selected, for example if metal parts are largely excluded.

Furthermore, the outer shapes, for example, of the lower part 20 and of the upper part 10 can be changed. The shape in plan view can also be polygonal, for example hexagonal, octagonal or dodecagonal, instead of essentially circular. The rising pipe does not have to be round in plan view either, but can have any other shape. More or fewer than two openings, for example one, three, four, five or six, can also be present at the upper end of the rising pipe.

A construction other than the construction described is also possible. There are coffee-makers, for instance, in which water is made to boil in a lower chamber and, owing to the boiling pressure, is conducted through a rising pipe into an upper chamber without passing through a brewing chamber. The coffee powder is then usually located directly in the upper chamber and is not brought into contact with the water until it arrives there. In this case, a strainer with a plurality of small openings is usually present between the upper and lower chambers. When the lower chamber cools, a vacuum is created, which sucks the ready coffee through the strainer into the lower chamber, while the leached coffee grounds are retained. A splash guard as provided in the present invention is advantageous in such a coffee-maker as well.

What is claimed is:

1. Coffee-maker, comprising an upper part with an upper chamber, a rising pipe extending into said upper chamber, said rising pipe having at least one laterally arranged opening provided in an upper end region, and a lid adapted for closing the upper chamber, wherein said lid comprises a splash guard which, when the lid closes the upper chamber, extends at least to the lower edge of said at least one opening of the rising pipe and has a lateral distance from said rising pipe.

2. Coffee-maker according to claim 1, wherein a plurality of radial openings are present in said upper end region of said rising pipe.

3. Coffee-maker according to claim 1, wherein said splash guard has the shape of a ring.

4. Coffee-maker according to claim 1, wherein said splash guard is made in one piece with said lid.

5. Coffee-maker according to claim 1, wherein said lid is articulated pivotably on the said upper part.

6. Coffee-maker according to claim 1, wherein at least one of said lid and said upper part is at least partly transparent.

7. Coffee-maker according to claim 6, wherein at least one of said lid and said upper part is made at least partly of polycarbonate.

8. Coffee-maker according to claim 1, wherein said coffee-maker furthermore has a lower part with a lower chamber for receiving water and a brewing insert for receiving ground coffee, said lower part, said brewing insert and said upper part being arranged in such a way that water can pass from said lower chamber through said brewing insert into said upper chamber.

9. Coffee-maker according to claim 8, wherein said lower part comprises a safety valve which is arranged close to an upper end of said lower part, and wherein said upper part has an apron which is suitable for covering said safety valve.

10. Coffee-maker according to claim 8, wherein electrically operated means for heating water are provided in said lower chamber.

11. Coffee-maker according to claim 1, wherein two openings disposed in a radially opposing configuration are provided in said upper region of said rising pipe.

* * * * *